United States Patent
Lee et al.

(10) Patent No.: US 10,297,028 B2
(45) Date of Patent: May 21, 2019

(54) IMAGE DATA ANALYTICS FOR COMPUTATION ACCESSIBILITY AND CONFIGURATION

(71) Applicant: National Cheng Kung University, Tainan (TW)

(72) Inventors: Gwo Giun Lee, Tainan (TW); Shih-Yu Hung, Taipei (TW); Tai-Ping Wang, New Taipei (TW)

(73) Assignee: National Cheng Kung University, Tainan (TW)

( * ) Notice: Subject to any disclaimer, the term of this patent is extended or adjusted under 35 U.S.C. 154(b) by 70 days.

(21) Appl. No.: 15/645,640

(22) Filed: Jul. 10, 2017

(65) Prior Publication Data
US 2019/0012759 A1 Jan. 10, 2019

(51) Int. Cl.
*G06K 9/00* (2006.01)
*G06T 1/20* (2006.01)
*G06T 7/162* (2017.01)
*G06T 7/11* (2017.01)

(52) U.S. Cl.
CPC .......... *G06T 7/162* (2017.01); *G06K 9/00127* (2013.01); *G06T 1/20* (2013.01); *G06T 7/11* (2017.01); *G06T 2207/20152* (2013.01)

(58) Field of Classification Search
None
See application file for complete search history.

(56) References Cited

U.S. PATENT DOCUMENTS

| | | | | |
|---|---|---|---|---|
| 2005/0226506 A1* | 10/2005 | Aharon | ..................... | G06T 7/11 382/180 |
| 2009/0297015 A1* | 12/2009 | Jetzek | ................ | G01N 15/1475 382/133 |
| 2012/0301017 A1* | 11/2012 | Freedman | ................. | G06T 7/12 382/164 |

(Continued)

OTHER PUBLICATIONS

Lin, Gang, et al. "A hybrid 3D watershed algorithm incorporating gradient cues and object models for automatic segmentation of nuclei in confocal image stacks." Cytometry Part A: the journal of the International Society for Analytical Cytology 56.1 (2003): 23-36. (Year: 2003).*

(Continued)

*Primary Examiner* — Nurun N Flora
(74) *Attorney, Agent, or Firm* — Wang Law Firm, Inc.

(57) ABSTRACT

The image data analytics for computation configuration method and computer system with computation accessibility is provided. The computation accessibility and configuration on image data processing are implemented by a plurality of computers having a plurality of processors and a plurality of data storages, the image data analytics for computation accessibility and configuration includes the following steps: inputting an original image by an input device and initializing the original image; defining a plurality of tiles equally dividing the original image into a same size of a regular shape; transferring the plurality of image regions to form a graph having vertices and edges; cutting the graph into a plurality of sub-graphs; arranging the plurality of sub-graphs to the plurality of processors or cores to conduct parallel processing simultaneously for analyzing the image data; and storing a plurality of processing results respectively in the plurality of data storages.

12 Claims, 10 Drawing Sheets

(56) References Cited

U.S. PATENT DOCUMENTS

| | | | | |
|---|---|---|---|---|
| 2014/0286579 A1* | 9/2014 | Grujic | ............... | G06K 9/00986 |
| | | | | 382/203 |
| 2015/0030219 A1* | 1/2015 | Madabhushi | ........... | G06T 7/149 |
| | | | | 382/128 |
| 2015/0078648 A1* | 3/2015 | Lee | ..................... | G06K 9/0014 |
| | | | | 382/133 |

OTHER PUBLICATIONS

Liu, Ting, et al. "Watershed merge tree classification for electron microscopy image segmentation." Pattern Recognition (ICPR), 2012 21st International Conference on. IEEE, 2012. (Year: 2012).*

* cited by examiner

IMAGE DATA ANALYTICS FOR COMPUTATION ACCESSIBILITY AND CONFIGURATION

BACKGROUND OF THE INVENTION

1. Field of the Invention

The present disclosure generally relates to a computation configuration method and a computer system based on image data analysis, in particular to the computation accessibility and configuration which are feasible to speed up the computing to the image data analysis by the multiple processors or multi-core processors. According to the image data analytics for computation accessibility and configuration thereof, the workload to the multiple processors or multi-core processors, or the transfer rate of the data among the processors and the data storages may be equally distributed and improved.

2. Description of the Related Art

Currently, the development of the computer and algorithm technique makes the accuracy for analyzing image data gradually increased. The original analytical manpower is no longer needed or easily replaced by the computer. However, the amount of data in the image also increases gradually. For example, the high resolution or high penetration image generated by the Harmonically Generated Microscopy (HGM) camera or Harmoscope contains large information from the real object or biological status. For efficiently processing such huge data included in the original image, the high computation ability of the processing units is needed. When processing the large amount of data, the calculation performance may decrease. For example, some algorithms employ complicated arithmetic such that the analysis step spends a lot of processing time and processing units. Therefore, the analysis method has to be improved.

For improving the processing time, the parallel processing is provided and the data for analysis are divided into pieces and sent to the different processing units. Each processing unit may process the data simultaneously to generate the partial results and then the above results are combined as the final result. However, regarding different kinds of image, the divided parts of the original data may have irregular shape or size. The data transfer rate or the data storage may be affected due to the irregular data shape or size for each processing units.

As a result, the inventor of the present disclosure has been mulling the technical problems over and then therefore designs the image data analytics for computation configuration method and computer system with computation accessibility thereof which aims to resolve the existing shortcomings, so as to promote the industrial practicability.

SUMMARY OF THE INVENTION

In view of the aforementioned technical problems, one objective of the present disclosure is to provide the image data analytics for computation accessibility and configuration, which is capable of partitioning image data efficiently for parallel processing with low data transfer rate among processors and balanced workload distribution to multiple processors or multi-core processors.

According to one objective of the present disclosure, a computation configuration method based on image data analytics is provided. The computation configuration method is implemented by a plurality of computers having a plurality of processors and a plurality of data storages. The image data analytics includes the following steps: inputting an original image by an input device, the original image being initialized to generate a plurality of image regions; defining a plurality of tiles equally dividing the original image into a same size of a regular shape, the plurality of image regions being arranged to at least one of the plurality of tiles; transferring the plurality of image regions to form a graph having vertices and edges, each of the vertices corresponding to one of the plurality of image regions and having a vertex size derived by an amount of tiles covering the corresponding image region, and each of the edges having a weight between a pair of vertices and the weight corresponding to an amount of overlapped tiles between the pair of vertices; cutting the graph into a plurality of sub-graphs, each of the plurality of sub-graphs comprising at least one of the plurality of vertices; arranging the plurality of sub-graphs to the plurality of processors to conduct parallel processing simultaneously for analyzing the image; and storing a plurality of processing results respectively in the plurality of data storages.

Preferably, the original image may be initialized by a gradient map, a filtering process or a watershed transform to generate the plurality of image regions.

Preferably, the weight may be obtained by dividing the amount of overlapped tiles by a sum of the vertex size of the pair of vertices.

Preferably, the computation configuration method based on image data analytics may further include the step of: merging a small vertex to a neighboring vertex while the vertex size corresponding to the small vertex is less than a predetermined minimum size of the plurality of tiles.

Preferably, the computation configuration method based on image data analytics may further include the step of: isolating a large vertex to divided graphs while the vertex size corresponding to the large vertex is greater than a predetermined maximum size of the plurality of tiles.

Preferably, the step of cutting the graph into the plurality of sub-graphs may be obtained by using a clustering algorithm.

According to another objective of the present disclosure, a computer system with computation accessibility based on the image data analytics is provided. The computer system includes an input device, a plurality of processors and a plurality of data storages. An original image is inputted by an input device. The plurality of data storages store a plurality of instructions for controlling the plurality of processors to execute the following steps: initializing the original image to generate a plurality of image regions; defining a plurality of tiles equally dividing the original image into a same size of a regular shape, the plurality of image regions being arranged to at least one of the plurality of tiles; transferring the plurality of image regions to form a graph having vertices and edges, each of the vertices corresponding to one of the plurality of image regions and having a vertex size derived by an amount of tiles covering the corresponding image region, and each of the edges having a weight between a pair of vertices and the weight corresponding to an amount of overlapped tiles between the pair of vertices; cutting the graph into a plurality of sub-graphs, each of the plurality of sub-graphs comprising at least one of the plurality of vertices; arranging the plurality of sub-graphs to the plurality of processors to conduct parallel processing simultaneously for analyzing images.

Preferably, the original image may be initialized by a gradient map, a filtering process or a watershed transform to generate the plurality of image regions.

Preferably, the weight may be obtained by dividing the amount of overlapped tiles by a sum of the vertex size of the pair of vertices.

Preferably, the computer system with computation accessibility based on image data analytics may further include a step of: merging a small vertex to a neighboring vertex while the vertex size of the small vertex is less than a predetermined minimum size of the plurality of tiles.

Preferably, the computer system with computation accessibility based on image data analytics may further include a step of: isolating a large vertex to divided graphs while the vertex size of the large vertex is greater than a predetermined maximum size of the plurality of tiles.

Preferably, the step of cutting the plurality of graphs into the plurality of sub-graphs may be obtained by using a clustering algorithm.

Preferably, the computation accessibility is used to store a plurality of data of image regions being arranged to at least one of the plurality of tiles and a plurality of information, processing results, and processed results of the plurality of graphs.

As mentioned previously, the image data analytics for computation configuration method and computer system with computation accessibility for processing images of the present disclosure may have one or more advantages as follows.

1. The image data analytics for computation accessibility and configuration for processing images of the present disclosure are able to transfer the original image to the graph with vertices and edges, so that the calculation of the partitioning may be achieved easily.

2. The image data analytics for computation accessibility and configuration for processing images of the present disclosure are able to provide the spectral graph partitioning to the original image formed by the graph with vertices and edges, so that the partitioning regions have proper size and dependency to improve the data transfer rate and balance the loading of the parallel processing.

3. The image data analytics for computation accessibility and configuration for processing images of the present disclosure are able to apply to different kinds of images, so that the analysis to images becomes more efficiency.

DETAILED DESCRIPTION OF THE PREFERRED EMBODIMENTS

In order to facilitate the understanding of the technical features, the contents and the advantages of the present disclosure, and the effectiveness thereof that can be achieved, the present disclosure will be illustrated in detail below through embodiments with reference to the accompanying drawings. On the other hand, the diagrams used herein are merely intended to be schematic and auxiliary to the specification, but are not necessary to be true scale and precise configuration after implementing the present disclosure. Thus, it should not be interpreted in accordance with the scale and the configuration of the accompanying drawings to limit the scope of the present disclosure on the practical implementation.

In accordance with the embodiment(s) of the present disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions accessible by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Figure 1:
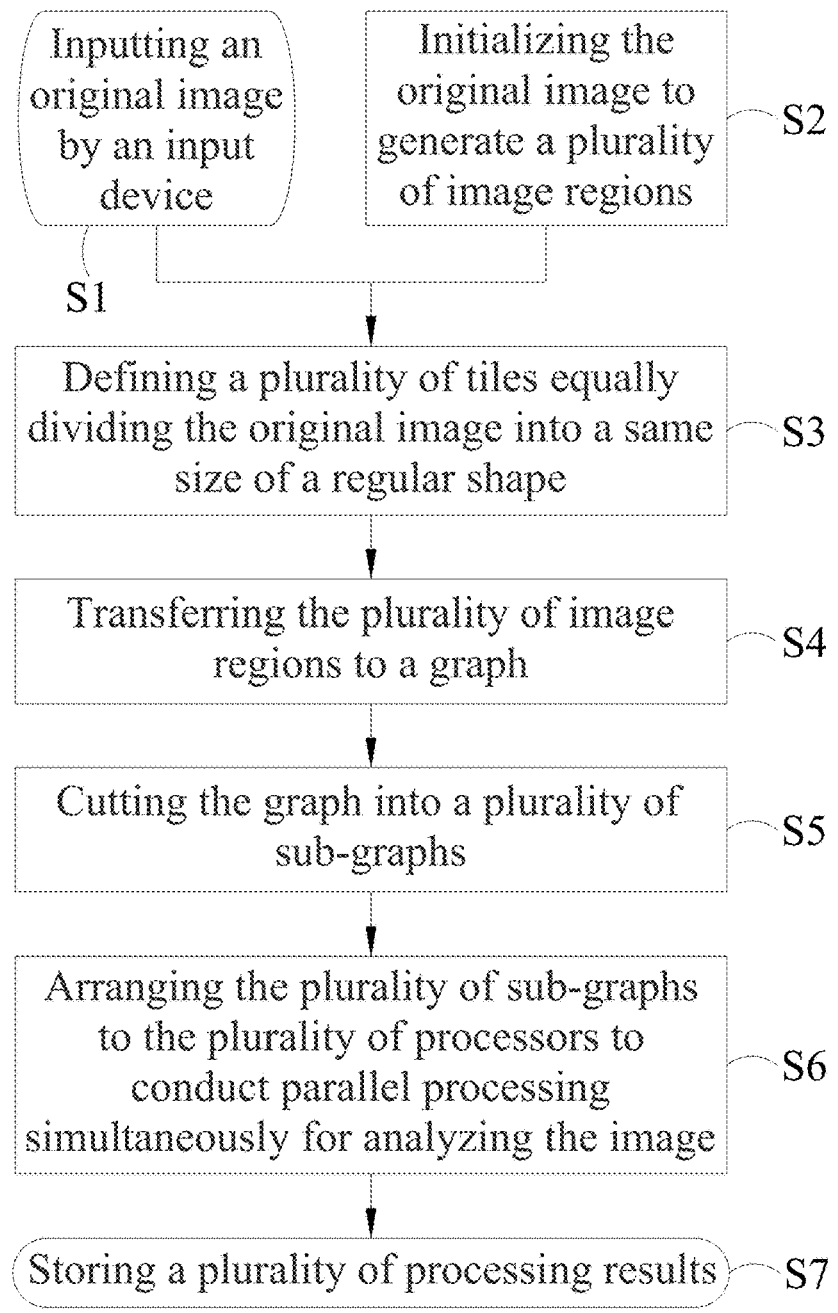
FIG. 1 is a flow chart of the computation configuration method based on image data analytics of the present disclosure.

Please refer to FIG. 1 which is a flow chart of a computation configuration method based on image data analytics of the present disclosure. As shown in the figure, the product disassembling method includes the following steps (S1-S7). The steps are executed by a plurality of instructions stored in the data storages for controlling the plurality of processors. The plurality of processors may be multiple processors in one or more computers or a single processor having multiple cores in one computer in which each core may be deemed as a processor. The plurality of processors may also refer to a plurality of computers having a plurality of processors with or without a plurality of cores.

Step S1: Inputting an original image by an input device. Firstly, the original image has many kinds of formats, such as photo, media file, or graphics. Each of the original data can be collected by an electrical device or be transformed to an electrical file. The electrical device may be the input device, such as the Harmoscope or camera. Alternatively, the input device may be the general computer for transferring or receiving the image file from the other optical device. The original image may also include 2D image and 3D image. For the convenience, the biomedical image with nucleus and cytoplasm is used in the following descriptions. However, the original image of the present method is not limit in such biomedical image. The other image or data, which needs to be analyzed to obtain more information, should be included in the present method. Since the resolution of the image becomes higher, the quantity of data included in the original data also increases and needs more process units to analyze such big data.

Step S2: Initializing the original image to generate a plurality of image regions. After the original image is inputted. The original image is initialized by several methods. Since the image contains different grey levels, the original image can be presented by a gradient map. Furthermore, the two-dimensional filter, separable filter or fast fourier transform based process can be used to find the required information. In addition, the watershed transform is provided. Considering the pixel intensity within gray-level image as three-dimensional topographic surface, that is to say, the intensity values are interpreted as their altitude of the landscape. Based on this method, the regional minima, catchment basin, and watershed line is considered to transform the original image into several blocks or segments.

Figure 2:
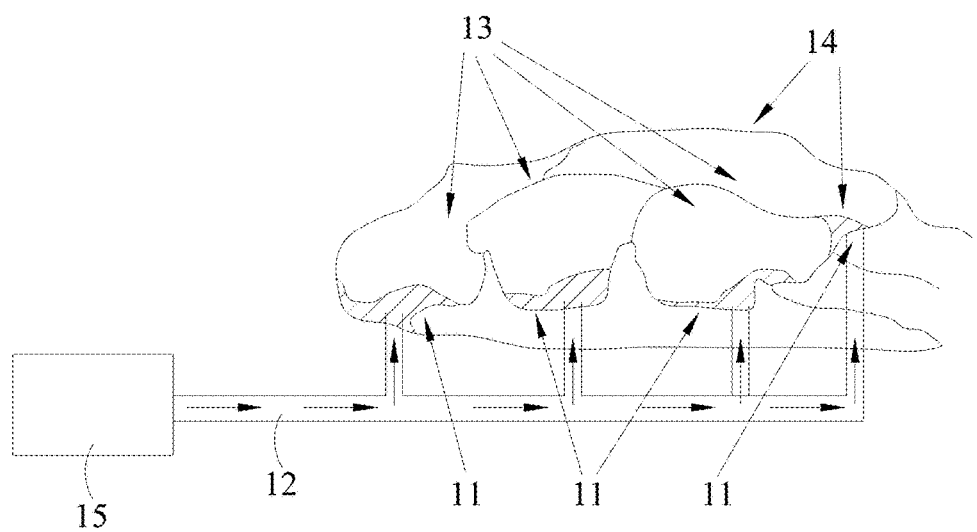
FIG. 2 is a topographical view of a watershed transform of the present disclosure.

Please refer to FIG. 2 which is a topographical view of a watershed transform of the present disclosure. As shown in the figure, every regional minima 11 become holes and connected with water pipes 12. Once the water pour from water source 15 and flow through the pipes, the area near by regional minimum 11, also called catchment basins 13, will be flooded follows the level set at a constant rate. More water flow in basins, more area will be flooded. The main objective is to build the dams when water pouring from different catchment basins 13 and meet together on the watershed lines 14. The desired contour of objects have been segmented and found. After the image regions being generated by several watershed lines 14. The conventional analysis method to the image may use some markers to point out the desired regions or the image within the regions. Then blob detection, outlier removal and distance transform and cell boundary have been used to detect the information of the original image. However, the image regions segmented by the watershed transform may have irregular shape, size or different dependency between regions. Even if the different regions can be processed by different processors with or without multi-cores, the data loading or the data transfer rate may be unbalanced, thereby the process efficiency may decrease correspondingly. For solving the above issues, the process is provided as followed.

Figure 3:
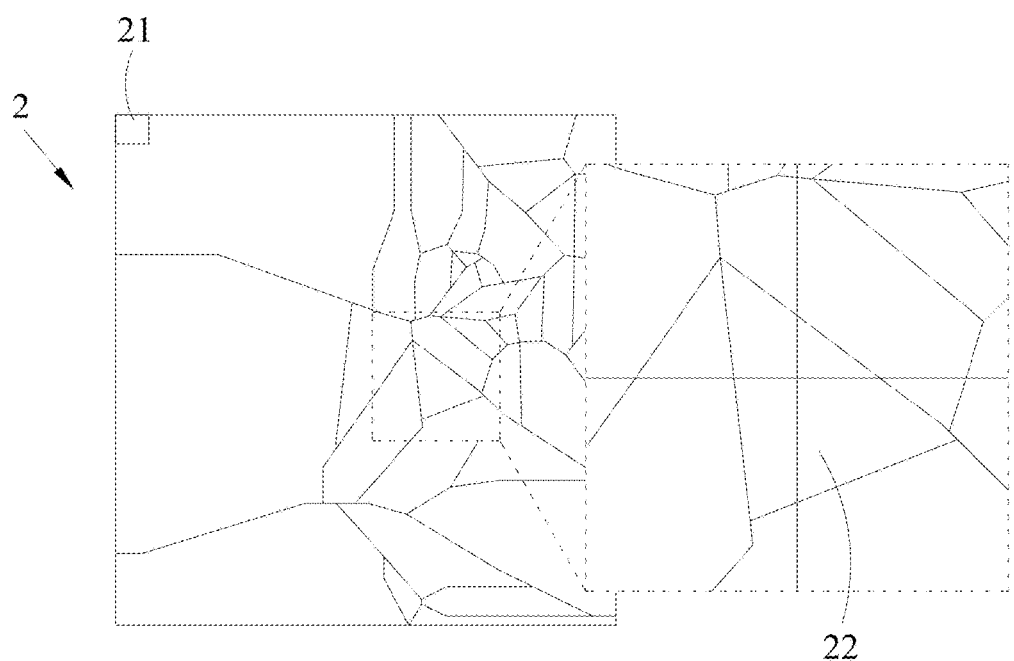
FIG. 3 is a schematic diagram of an original image with tiles and image regions of the present disclosure.

Step S3: Defining a plurality of tiles equally dividing the original image into a same size of a regular shape. According to step S2, the original image has several image regions with irregular shape or size. The present disclosure method defines several tiles to divide the original image into the same sized blocks with regular shape. The size of each tile or the number of tiles depends on the minimum processing unit of the processors. By overlapping the plurality of tiles to the plurality of image regions, the plurality of image regions being arranged to at least one of the plurality of tiles. Please refer to FIG. 3 which is a schematic diagram of an original image with tiles and image regions of the present disclosure. As shown in the figure, the original image 2 is divided into 64 tiles 21 (8×8 blocks). The image region 22 of the original image 2 covers 4 blocks as indicated in the enlarged view. That is, the image region 22 is arranged to those 4 tiles.

Step S4: Transferring the plurality of image regions to a graph. Since the plurality of image regions are arranged to the plurality of tiles, each of the image regions can be transferred to a corresponding vertex of a graph. The graph may consist of vertex set, edge set and the relation between an edge and a pair of vertices it connects. When the image regions become vertices of the modeled graph, the image divided for parallel processing may become the graph partition problem.

Figure 4A:
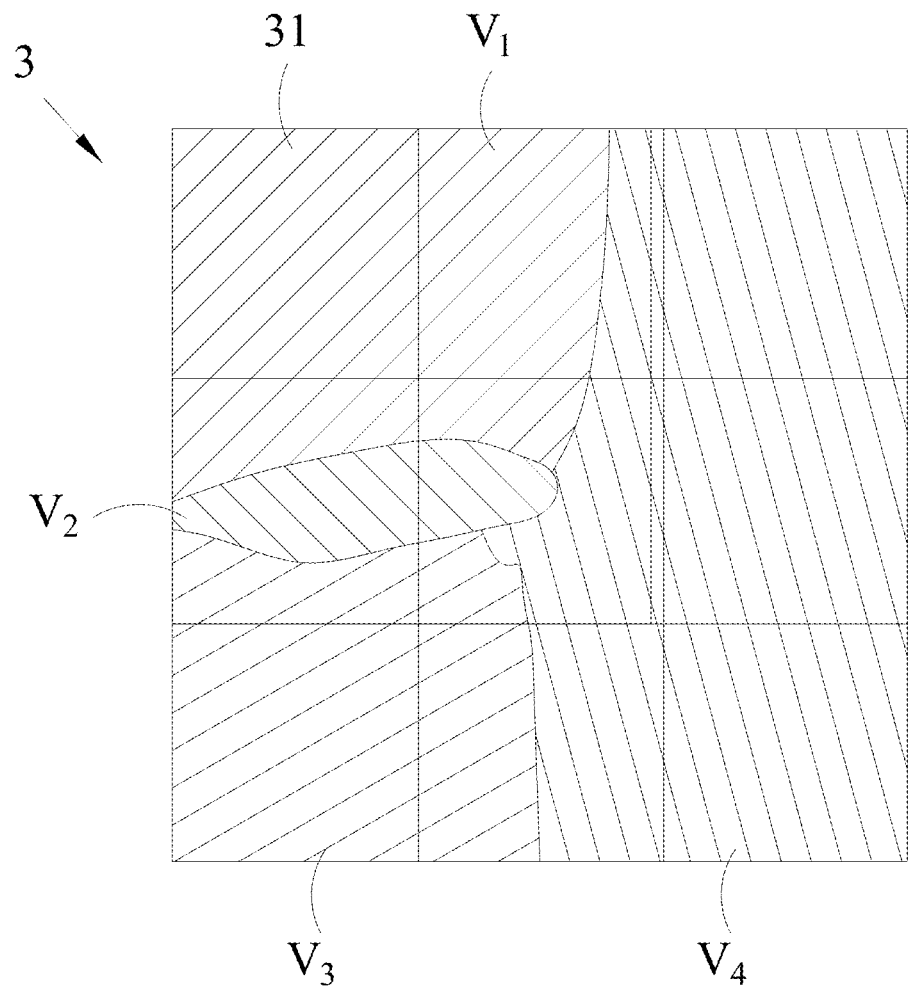
FIG. 4A is a schematic diagram of a partial image having vertices of the present disclosure.
Figure 4B:
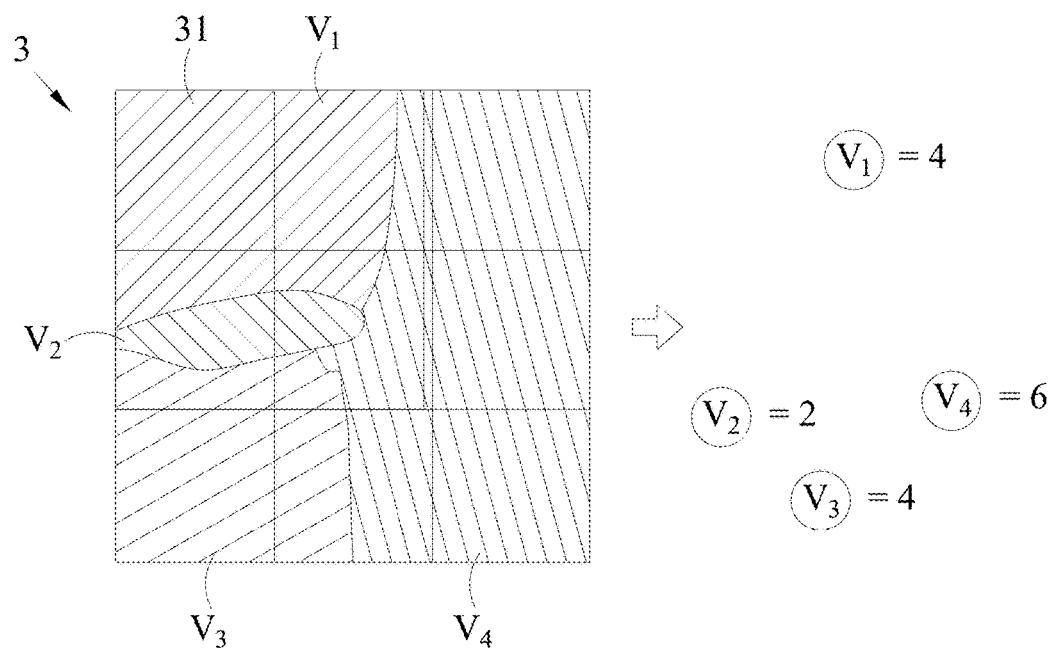
FIG. 4B is a schematic diagram of the vertex modeling of the present disclosure.

Please refer to FIG. 4A which is a schematic diagram of a partial image having vertices of the present disclosure. As shown in the figure, partial image 3 may be part of the original image and the partial image 3 has 9 tiles 31 (3×3 blocks). The partial image 3 includes first to fourth vertices (V1-V4), which are represented as the corresponding image regions. The single vertex has been regarded as a smallest task unit for parallel processing. Please refer to FIG. 4B which is a schematic diagram of the vertex modeling of the present disclosure. As shown in the figure, the image regions are modeled as the first to fourth vertices (V1-V4). Since different region size denotes different computation loads, the vertex size is derived by calculating the amount of tiles covered by the corresponding image region. That is, the vertex size of the first vertex V1 is 4 and the vertex size of the remainders are respectively 2, 4 and 6. In other words, the loading for processing the fourth vertex V4 is larger than the others.

Figure 4C:
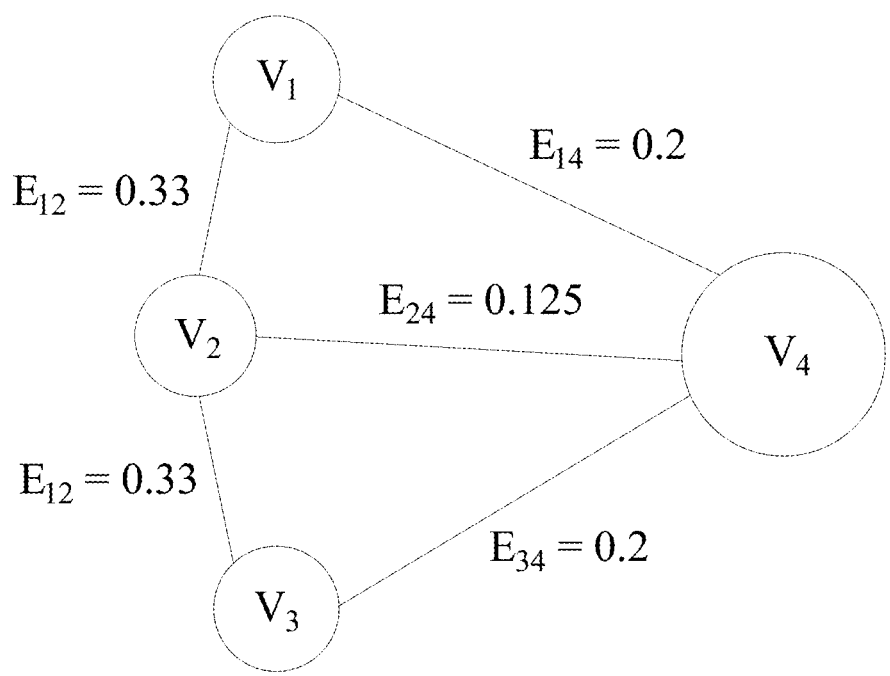
FIG. 4C is a schematic diagram of the edge modeling of the present disclosure.

After modeling the vertex of the image, the relationship between the vertices should also be considered. Referring to FIG. 4A again, the first vertex V1 and the second vertex V2 cover two same tiles. The pair of vertices nearby each other might use some parts of the tiles which mean some portion of data will be re-transferred into processors more than one time. Therefore, if the pair of vertices is assigned to the same processor, the re-transferred process can be avoided so as to improve the efficiency. Please refer to FIG. 4C which is a schematic diagram of the edge modeling of the present disclosure. As shown in the figure, the edge E12 indicates the relation between the first vertex V1 and the second vertex V2. The other edges E14, E23, E24 and E34 also indicate the relation between the corresponding pair of vertices. In the present embodiment, the relation having a weight and the weight corresponding to an amount of overlapped tiles between the pair of vertices. More specifically, the weight represents the proportionate overlapping area between the two image regions, which define as the following Equation.

$$w_{ij} = \frac{\text{Number of Overlapped Tiles}_{ij}}{\text{Vertex Size}_i + \text{Vertex Size}_j} \quad (1)$$

Where numerator is the number of overlapped tiles; denominator is the total size of vertices. Higher percentage of overlapped between image regions results in larger weights of edge. Namely, larger weight denotes strong connection; small weight represents weak connection. According to the above Equation, the weight of edge E12 may be 2/(4+2)=0.33. The weights of the other edges E14, E23, E24 and E34 may also calculate in the same way.

Since the graph includes vertex set, edge set and the relation between the edge and the pair of vertices, the graph may be represented as a matrix, which is capable of improve the efficiency of partitioning.

Adjacency matrix is a square matrix which is able to represent an arbitrary graph. And some basic elements can be easily known by matrix observation, such as the number of vertices to compute the graph can be observed by the matrix size; the connectivity can be evaluated by calculating the summation of the row or column corresponding this specific vertex. The adjacency matrix representation can be denoted as the following Equation.

$$W_{i,j} = \begin{cases} 1 & \text{if } v_i \text{ and } v_j \text{ adjacent to each other} \\ 0 & \text{otherwise} \end{cases} \quad (2)$$

The Laplacian matrix L, also called graph Laplacian matrix is similar to the second-order differential operator that be computed by the diagonal matrix D minus the adjacency matrix W. The diagonal elements of Laplacian matrix represents the number of edges connected to that vertex, where the off-diagonal element denotes whether two vertices are connected or not. The Laplacian matrix representation can be denoted as the following Equation.

$$L_{i,j} = D_{i,j} - W_{i,j} = \begin{cases} deg(v_i) & \text{if } i = j \\ -1 & \text{if } i \neq j \text{ and } v_i \text{ is adjacent to } v_j \\ 0 & \text{otherwise} \end{cases} \quad (3)$$

Where $L_{i,j}$ is n by n matrix and n is equal to number of vertices in graph. $D_{i,j}$ is degree matrix, the diagonal elements deg $(v_i)$ is the degree of vertex $v_i$ in graph. $W_{i,j}$ is the adjacency matrix. The element represents the relationship between each pair of vertices.

Step S5: Cutting the graph into a plurality of sub-graphs. The destination of graph cut is trying to find the minimum cut of modeled graph by pruning particular edges within pairs of vertices which solving to optimal partitioning solution. Hence those partitioned sub-graphs have maximum similarity within sub-graphs and minimum similarity between sub-graphs. The graph cut measures the degree of dissimilarity between two partitioned sub-graphs, and can be considered as the sum of weights of all removed edges from two disjoint sub-graphs. Graph cut can be denoted as:

$$\text{cut}(A,B) = \Sigma_{i \in A, j \in B} w_{ij} \quad (4)$$

Where A and B are two disjoint sub-graphs in the graph G and $w_{i,j}$ represents the weighting on the edge between vertex i and vertex j, whose the range of the weighting locates within [0, 1].

For conducting the graph cut, Bi-partitioning the graph model is the technique for such graph partition problems. The concept of graph cut is to find the minimum weighting sum by removing the edges, so as to bisection a graph into two sub-graphs. Using matrix representation as a graph introduced above, when the plurality of graphs have a matrix representation, graph cut derived from equation (4) can also be denoted as:

$$\text{cut}(A, B) = \sum_{i \in A, j \in B} w_{ij} = \frac{1}{4} \sum_{i \in A, j \in B} w_{ij}(f_i - f_j)^2 = \frac{1}{4} F^T L F \quad (5)$$

Where $F=(f_1, \ldots, f_n)^T$ is an n-dimensional indicator vectors. With this objective function, graph cut measurement becomes the calculation of the second smallest eigenvalue from Laplacian matrix. Therefore, the second smallest eigenvalue from Laplacian matrix is calculated, so that the partitioning performs the most dissimilarity between different sub-graphs.

Another perspective way compare to the Bi-partitioning is the k-partitioning. Although Bi-partition provides a good partitioning technique, not all applications can be satisfy the two group or 2n groups' constraints. With the same concept of objective function and eigen-decomposition from Laplacian matrix to acquire the indicator vector for Bi-partition, k-partitioning of spectral graph select top k eigenvectors corresponding to the k smallest eigenvalues as alternative way. In this technique, the first k eigenvectors corresponding to the first k smallest eigenvalue after eigen-decomposition is selected to span a new eigenspace, such that the properties of clusters are enhanced. Then based on the matrix expression of graph, new eigenspace is spanned consequently by selected k eigenvectors, vertices are represented in a $R^{m \times k}$ space. With new eigenspace, each vertex will be inner product onto k basis of this space for partitioning which means the similarity measurement between vertices and k basis. Therefore, the properties of clusters may be enhanced, and may be partitioned easily.

Figure 5:
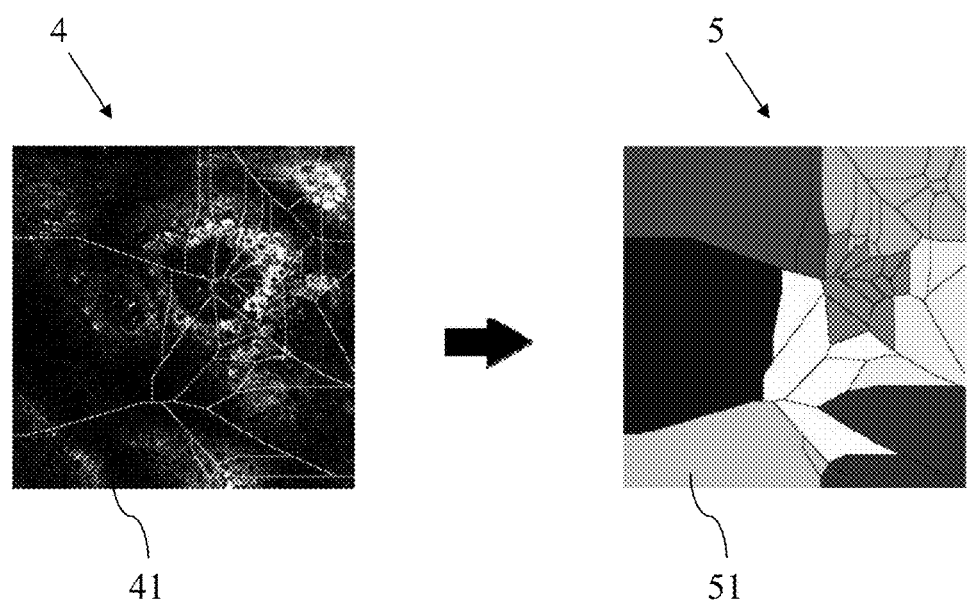
FIG. 5 is a schematic diagram of the k-partitioning result of the present disclosure.

Step S6: Arranging the plurality of sub-graphs to the plurality of processors to conduct parallel processing simultaneously for analyzing the image. Please refer to FIG. 5 which is a schematic diagram of the k-partitioning result of the present disclosure. As shown in the figure, the original image 4 is divided into many irregular image regions 41. After defining the tiles for transferring the original image to a graph, the graph has being cut into a plurality of sub-graphs 51 by k-partitioning technique. The k-partitioning result 5 is divided to several sub-graphs 51, which may contain at least one of the image regions indicated in the original image 4. Accordingly, the dependency of the graphs within the sub-graphs is high and the dependency between the sub-graphs is small. In this way, the sub-graphs can be arranged to different processors or cores for conducting the parallel processing. The computation configuration defines the arrangement of the sub-graphs of the original image or data to the multiple processors or multi-core processors. Since the processes for analyzing image data within the sub-graph are executed on a same processor or core, the similar or overlapped data no longer need to be reloaded to multiple processors or cores, thereby the process efficiency and the data transfer rate may be improved. In addition, by using the tiles and the clustering algorithm as described above, the sub-graphs may have the similar size or similar data amount. Therefore, the process loading to every processor or core may be balanced, and the overloaded work load to the specific processor or core will be avoided. The computational resource may be allocated for better use.

When the sub-graphs are arranged to the processors or cores to conduct parallel processing simultaneously, the divided regions of the original image may be analyzed simultaneously. In the present embodiment, the analysis to the image is trying to extracts and segments the nucleus and cytoplasm of the cells in the medical images. However, the present invention is not limited thereto. The other diagnosis to the medical image or the extraction of different kinds of image or data may also be included in the present application.

Step S7: Storing a plurality of processing results. According the step S7, the sub-graphs are analyzed by different processors, which may refer to multi-cores processor. Alternative, the different processors may be different computers connected by wire or wireless connection. That is, the processors can be the computational resource from the cloud server. With different structures described above, the storage device may also have different requirement. Generally, the different computers may provide different storage device, such as the memory or other storage medium. The processing result from the processor may be stored individually, and then the respective results are combined for a final result. Since the original image is divided in similar size and higher dependency, the data transfer rate and the data storage may be improved.

Figure 6:
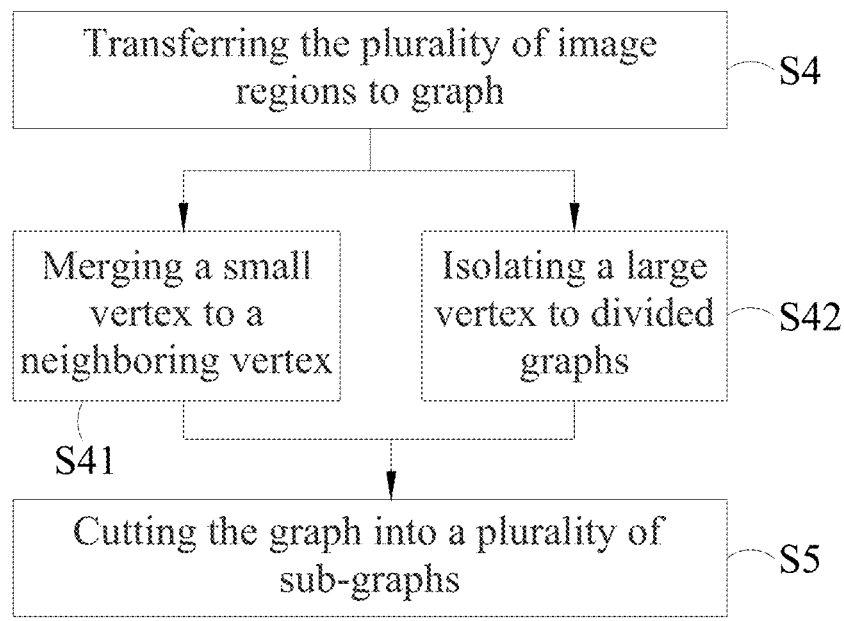
FIG. 6 is a sub-process of the computation configuration method based on image data analytics of the present disclosure.

Please refer to FIG. 6 which is a sub-process of a computation configuration method based on image data analytics of the present disclosure. As shown in the figure, the two steps (S41, S42) are included between the step S4 and the step S5. The content of the "transferring the plurality of image regions to a graph" in step S4 and "cutting the graph into a plurality of sub-graphs" in step S5 are the same as that applied in the aforementioned embodiment, and the unnecessary details are no longer given herein. The sub-steps of the image data analytics are described as follows.

Figure 7:
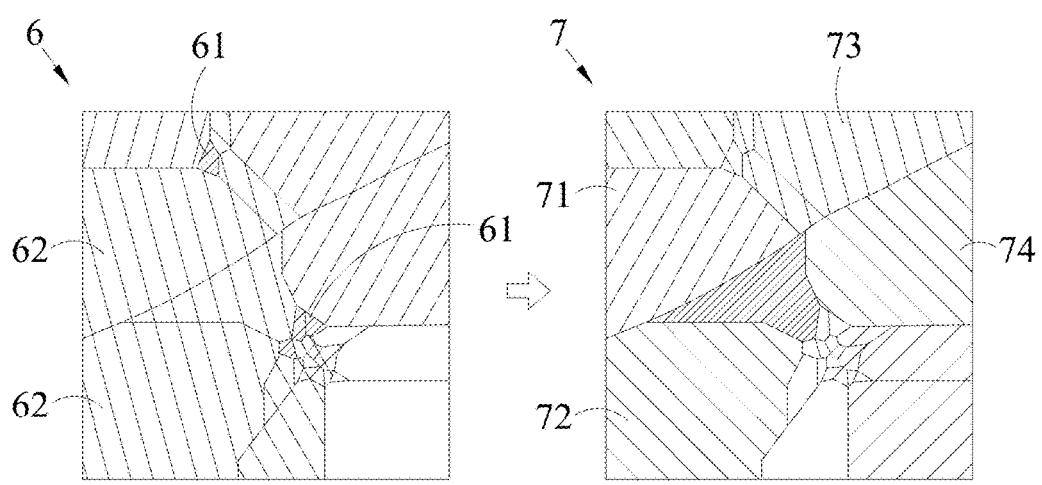
FIG. 7 is a graph partitioning result with and without sub-process of the present disclosure.

Step S41: merging a small vertex to a neighboring vertex. After cutting the plurality of graphs into several sub-graphs, the size of the sub-graph should be checked. Please refer to FIG. 7 which is a graph partitioning result with and without sub-process of the present disclosure. The partitioning result 6 may be the result generated by step S5 without conducting sub-process. As shown in the figure, the partitioning result 6 has small sub-graphs 61 separated from the other sub-graphs. The small sub-graph 61 is determined by the vertex size. When the vertex size of the image region is less than a predetermined minimum size of the tiles, such as 4 tiles or 2 tiles, the specific image region is identified as the small vertex. Although the dependency between the small vertex and the adjacent vertex may be small, arranging a single processor or core for processing such small vertex may cause the less utilization of the processors or cores. Therefore, the above small vertices are respectively merged into the neighboring vertices. As indicated in partitioning result 7 with merging step, the new sub-graphs 73 and 74 are generated and may respectively include the two small vertices 61.

Step S42: isolating a large vertex to divided graphs. When the sub-graphs are generated in previous step, the oversized sub-graph should also be checked. Also referring to FIG. 7, the large sub-graph 62 includes several vertices and some vertex size inside the large sub-graph 62 are greater than a predetermined maximum size of the plurality of tiles, for example: 16 tiles or 20 tiles. In order to balance the process loading to the processors or cores, the large sub-graph 62 may be isolated into two different sub-graphs 71 and 72. As the result, the new sub-graph 71 and sub-graph 72 may provide the proper size for arranging to the processors or cores, such that the process work of processing units won't be overloaded.

As mentioned above, the vertex size inside the sub-graph needs to be adjusted. Beyond that, the predetermined size of the extremely region may also be adjusted. For analyzing the image with different resolution, the tile size may be different, and the graph and the partitioning sub-graph may also change. Thereby the predetermined size for determining the small or large vertex may be adjusted accordingly. In addition, the step S41 and step S42 may be conducted together or separately. Those processes are implemented according to the resolution of the image and the computational ability of the processors or cores.

To evaluate the result of the above computation configuration method, the amount of transferred files and the balance measurement are the two indexes for measuring the effectiveness of the parallel processing. The amount of transferred files means that the numbers of tiles are transferred when dispatching vertices to processors or cores. In other words, less amount of transferred tiles, lower required data transfer rate. The balance measurement measures the degree of load balance within all processors or cores by evaluating the standard deviation of total tile number in clusters. That is, lower value of balance measurement, better partitioning for parallel processing. After analyzing 153 images, the quantified indicators for partitioning approaches between the conventional techniques and the present disclosure are listed in table 1. Based on the results, the image data analytics for computation accessibility and configuration of the present disclosure does require lower data transfer rate and have better partitioning for parallel processing.

TABLE 1

| Partitioning with indicators | conventional techniques | | | | Present disclosure |
|---|---|---|---|---|---|
| | K-means clustering | Agglomerative hierarchical clustering | Recursive coordinate bisection | Recursive graph bisection | |
| amount of transferred tiles | 115.2 | 119.0 | 114.6 | 118.7 | 111.6 |
| balance measurement | 6.9 | 8.9 | 8.5 | 8.5 | 6.1 |

Figure 8:
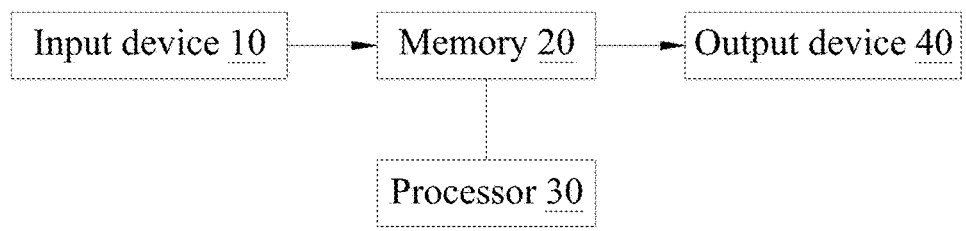
FIG. 8 is a schematic diagram of a computer system with computation accessibility based on image data analytics of the present disclosure.

Please refer to FIG. 8 which is a schematic diagram of a computer system with computation accessibility based on image data analytics of the present disclosure. As shown in the figure, the computer system includes an input device 10, a memory 20, a processor 30 and an output device 40. The memory 20 may be data storages designed by the image data analytics for computation accessibility. Components of the original image are stored in the memory 20 through an input device 10. The input device 10 includes input interfaces such as an optical device or a general computer. The processor 30 is connected to the memory 20 to access the instructions stored in the memory 20, so that the processor 30 configured by the image data analytics as the steps shown in FIG. 1 executes the image process. The processor 30 may include one or more processors with or without multi-cores connected with each other for conducting the parallel processing. The analyzed result derived from the processor 30 is the information included in the original image. The analyzed result may output through the output device 40. The output device 40, which may be a display applied to display the analyzed result, may be the display screen such as LCD, LED or OLED, or alternatively, may be a cable or wireless network transmitter. The output device 40 transmits the analyzed result to users, such that the users are able to obtain the final result of the image. The analyzed result may also store in the memory 20. The users may extract the analyzed result through the output device 40. As mentioned in the previous embodiment, the instructions stored in the memory 20 are able to provide the steps for processing an image. As a result, the data transfer rate and the loading balance may be improved. The processing efficiency may also increase.

While the means of specific embodiments in present disclosure has been described by reference drawings, numerous modifications and variations could be made thereto by those skilled in the art without departing from the scope and spirit of the invention set forth in the claims. The modifications and variations should in a range limited by the specification of the present disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Although the terms first, second, third, etc. may be used herein to describe various elements, components, loops, circuits, and/or modules, these elements, components, loops, circuits, and/or modules should not be limited by these terms. These terms may be only used to distinguish one element, component, loop, circuit or module from another element, component, loop, circuit or module. Terms such as "first," "second," and other numerical terms when used herein do not imply a sequence or order unless clearly indicated by the context. Thus, a first element, component, loop, circuit or module discussed below could be termed a second element, component, loop, circuit or module without departing from the teachings of the example implementations disclosed herein.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

What is claimed is:

1. A computation configuration method based on image data analytics, the computation configuration method being implemented by a computer having a plurality of processors and a plurality of data storages, the image data analytics comprising the following steps:
   inputting an original image by an input device, the original image being initialized to generate a plurality of image regions;
   defining a plurality of tiles equally dividing the original image into a same size of a regular shape, the plurality of image regions being arranged to at least one of the plurality of tiles;
   transferring the plurality of image regions to form a graph having vertices and edges, each of the vertices corresponding to one of the plurality of image regions and having a vertex size derived by an amount of tiles covering the corresponding image region, and each of the edges having a weight between a pair of vertices and the weight corresponding to an amount of overlapped tiles between the pair of vertices;
   cutting the graph into a plurality of sub-graphs, each of the plurality of sub-graphs comprising at least one of the plurality of vertices;
   arranging the plurality of sub-graphs to the plurality of processors to conduct parallel processing simultaneously for analyzing the image; and
   storing a plurality of processing results respectively in the plurality of data storages.

2. The computation configuration method based on image data analytics of claim 1, wherein the original image is initialized by a gradient map, a filtering process or a watershed transform to generate the plurality of image regions.

3. The computation configuration method based on image data analytics of claim 1, wherein the weight is obtained by dividing the amount of overlapped tiles by a sum of the vertex size of the pair of vertices.

4. The computation configuration method based on image data analytics of claim 1, the computation configuration method further comprising the following step:
   merging a small vertex to a neighboring vertex while the vertex size of the small vertex is less than a predetermined minimum size of the plurality of tiles.

5. The computation configuration method based on image data analytics of claim 1, the computation configuration method further comprising the following step:
   isolating a large vertex to divided graphs while the vertex size of the large vertex is greater than a predetermined maximum size of the plurality of tiles.

6. The computation configuration method based on image data analytics of claim 1, wherein the step of cutting the graph into the plurality of sub-graphs is obtained by using a clustering algorithm.

7. A computer system with computation accessibility based on image data analytics, comprising:
   an input device, inputting an original image;
   a plurality of processors; and
   a plurality of data storages, storing a plurality of instructions for controlling the plurality of processors to execute the following steps:
   initializing the original image to generate a plurality of image regions;
   defining a plurality of tiles equally dividing the original image into a same size of a regular shape, the plurality of image regions being arranged to at least one of the plurality of tiles;
   transferring the plurality of image regions to form a graph having vertices and edges, each of the vertices corresponding to one of the plurality of image regions and having a vertex size derived by an amount of tiles covering the corresponding image region, and the edge having a weight between a pair of vertices and the weight corresponding to an amount of overlapped tiles between the pair of vertices;
   cutting the graph into a plurality of sub-graphs, each of the plurality of sub-graphs comprising at least one of the plurality of vertices;
   arranging the plurality of sub-graphs to the plurality of processors to conduct parallel processing simultaneously for analyzing the image; and
   storing a plurality of processing results.

8. The computer system with computation accessibility based on image data analytics of claim 7, wherein the original image is initialized by a gradient map, a filtering process or a watershed transform to generate the plurality of image regions.

9. The computer system with computation accessibility based on image data analytics of claim 7, wherein the weight is obtained by dividing the amount of overlapped tiles by a sum of the vertex size of the pair of vertices.

10. The computer system with computation accessibility based on image data analytics of claim 7, the steps further comprising:
    merging a small vertex to a neighboring vertex while the vertex size of the small vertex is less than a predetermined minimum size of the plurality of tiles.

11. The computer system with computation accessibility based on image data analytics of claim 7, the steps further comprising:
    isolating a large vertex to divided graphs while the vertex size of the large vertex is greater than a predetermined maximum size of the plurality of tiles.

12. The computer system with computation accessibility based on image data analytics of claim 7, wherein the step of cutting the graph into the plurality of sub-graphs is obtained by using a clustering algorithm.

* * * * *